May 20, 1969  G. A. JEROME  3,445,554
MANUFACTURE OF SILICON CARBIDE RIBBONS
Filed March 11, 1966
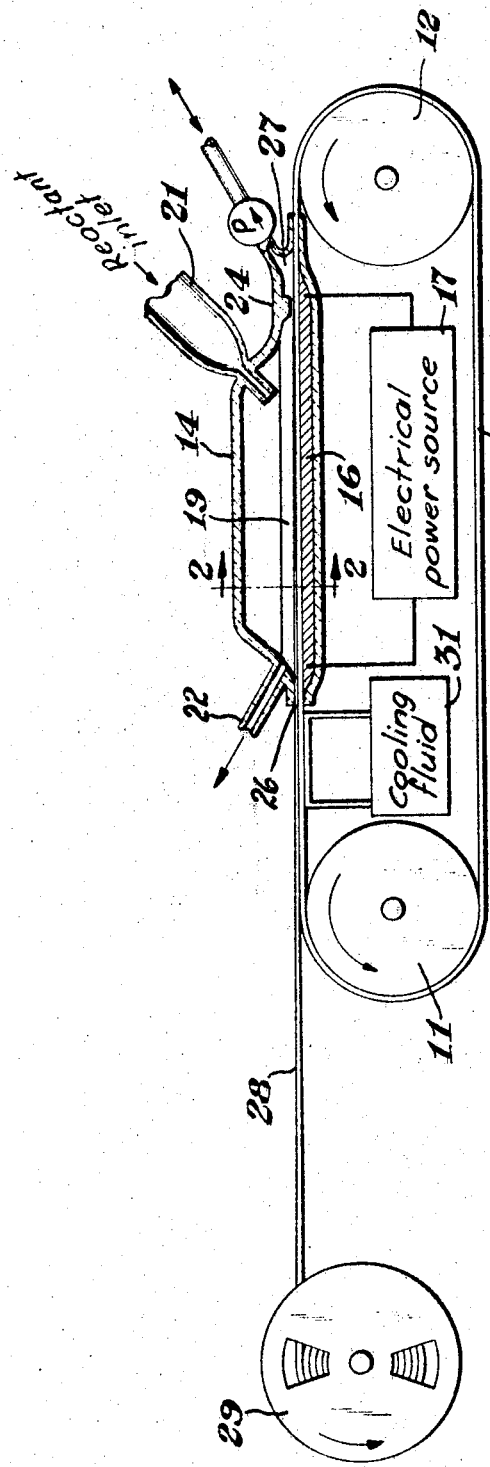
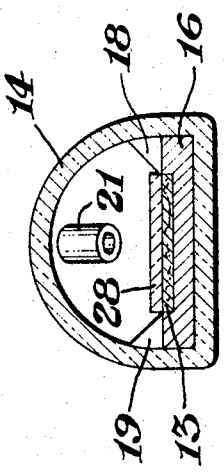
INVENTOR.
George A. Jerome
BY
Howard W. Hermann
ATTORNEY

United States Patent Office 3,445,554
Patented May 20, 1969

3,445,554
MANUFACTURE OF SILICON CARBIDE RIBBONS
George A. Jerome, Hemlock, Mich., assignor to Dow Corning Corporation, Midland, Mich., a corporation of Michigan
Filed Mar. 11, 1966, Ser. No. 533,576
Int. Cl. C04b 35/64, 33/32
U.S. Cl. 264—56         4 Claims

ABSTRACT OF THE DISCLOSURE

A method of making continuous dense, homogeneous silicon carbide ribbons or sheets is disclosed. Silicon carbide is pyrolytically deposited onto a heated, moving substrate having a smooth surface and a coefficient of thermal expansion which is different from that of the deposited silicon carbide. As the moving substrate cools, stresses between the substrate and the deposited silicon carbide ribbon cause the ribbon to separate from the substrate.

---

The present invention relates to methods and apparatus for forming structures of dense, substantially homogeneous silicon carbide and, more particularly, to the production of this material in ribbon form.

Silicon carbide is known to be an extremely hard, chemically inert, high strength material. It has been used for many years as an abrasive and for making dies. This material in its commonly known forms has not lent itself to easy fabrication of structural parts. In its more common applications, silicon carbide in particulate form is mixed with a binder and either molded or coated on surfaces. In the die making field, large, randomly produced silicon carbide crystals have been machined into dies. Recently, it has been suggested that silicon carbide may be pyrolytically deposited on various substrates as a protective coating, or for production of solid silicon carbide structures by etching away the substrate.

A need exists, however, for improved methods of producing homogeneous silicon carbide in sheet or ribbon form for applications such as semiconductor device substrates for high temperature use or as structural reinforcement elements. It is also desirable that any such methods be continuous for purposes of automation and economy.

It is, therefore, an object of the present invention to provide an improved method of producing homogeneous silicon carbide in sheet or ribbon form.

A further object is to provide a continuous method for the production of homogeneous silicon carbide ribbons or sheets, and apparatus for carrying out such method.

In accordance with these and other objects, there is provided by the present invention a method of continuously producing by deposition from the vapor phase a homogeneous silicon carbide ribbon of any desired width. Deposition is made on a heated moving substrate having a smooth surface and a coefficient of thermal expansion which is dissimilar to that of the deposited silicon carbide whereby the silicon carbide becomes non-adherent to the substrate as the substrate cools.

Other objects and advantages of the present invention will become obvious to those skilled in the art from a consideration of the following detailed description when read in conjunction with the accompanying drawing wherein:

FIG. 1 is a partly diagrammatic view in elevation, and partly in cross-section, of an embodiment of apparatus for performing the method of the present invention, and FIG. 2 is a cross-sectional view of a portion of the apparatus of FIG. 1 taken along the line 2—2 of FIG. 1 and looking in the direction of the arrows.

Referring now to the drawings, wherein like reference numerals represent like parts throughout the figures thereof, there is shown in FIG. 1 a pair of rollers 11, 12, at least one of which is driven by a suitable power source in the direction of the arrows, and around which passes a continuous belt 13 of material suitable for deposition of silicon carbide thereon. Suitable materials include molybdenum and tantalum, for example, but it will become apparent from the discussion hereinafter that other materials may also be used. In accordance with the invention, the outer surface of the belt 13 must be quite smooth and is preferably given an optically smooth finish in order to reduce any tendency of adherence of the silicon carbide thereto caused by the larger surface area and/or mechanical interference by surface irregularities.

A deposition chamber 14 surrounds a length of the moving belt 13. Heating means for the belt 13 must be provided to heat the belt during its passage through the deposition chamber. In the illustrated embodiment, there is provided in the deposition chamber an elongated resistance heating element 16 having a generally U-shaped cross-section (as may be best seen from FIG. 2), which is supplied by a suitable electrical power source 17. The opening in the U-shaped cross-section of the heating element corresponds as nearly as possible to the shape of the inner surface and sides of the belt 13 and thereby acts to shield those surfaces of the belt from deposition.

A pair of shielding members 18, 19 are preferably mounted on the resistance element to prevent deposition of silicon carbide thereon, although it is possible to allow deposition on the resistance element without seriously detracting from the operation of the system since the movement of the belt during deposition precludes any substantial adherence of the belt coating to the material deposited on the resistance heater. It is also to be realized that the heating element may, if desired, be placed outside the deposition chamber.

A reactant inlet 21 is provided on one end of the deposition chamber 14 for supplying reactive vapors thereto and an exhaust outlet 22 is provided at the opposite end of the deposition chamber for exhausting gases from the chamber. Although the reactant gas inlet 21 is shown on the drawing as being on the belt inlet end of the chamber, it is to be realized that it will function as well on the belt outlet end.

The belt inlet and outlet portions, 24 and 26 respectively, of the deposition chamber 14 are shaped to conform closely to the shape of the belt 13 and are made long in proportion to their opening size to provide for minimum contact with the ambient. It is desirable that a differentially pumped or pressurized chamber 27 be provided at the inlet end of the deposition chamber to remove ambient air leaking in through the area of entrance of the belt and thereby prevent contamination of the atmosphere in the deposition chamber 14. The chamber may be partially evacuated to remove any air leaking into it or alternatively may be supplied under small pressure with an inert gas such as argon, helium, or neon which prevents air from entering the chamber. If desired, a differentially pumped or pressurized chamber may be provided at the belt outlet as well.

In operation, the belt 13 is moved through the deposition chamber and is heated to at least about 1150° C., but below the melting point of the belt, by the heating element 16. A suitable reactant feed gas containing carbon and silicon for pyrolytic deposition is fed into the deposition chamber through the inlet 21.

Numerous suitable reactant gases are known for deposition by pyrolytic methods, as described for example in Canadian Patent No. 657,304, issued Feb. 5, 1963. In general, suitable gases include lower alkyl organosilicon compounds and mixtures of lower alkyl containing carbon compounds together with gaseous silicon compounds, which are usually mixed with a hydrogen carrier as described by the aforesaid Canadian patent. The preferred substances for this process include dimethyldichlorosilane, trimethylmonochlorosilane, propyltrichlorosilane, mixtures thereof and mixtures including monomethyltrichlorosilane. It is preferred that the ratio of starting carbon to starting silicon in these silanes and mixtures be at least 1.75 to 1 for best results. Hydrogen is preferred as a carrier gas and the preferred mixtures of silane with hydrogen are between 1 and 20 parts hydrogen to 1 part silane, by volume.

As is described for example in the aforementioned Canadian patent, the reactant gas mixture produces deposits of dense homogeneous silicon carbide on substrates heated to temperatures between about 1150° C. and about 1800° C. The choice of substrate materials is limited only by its melting point, its chemical stability with respect to the reactant gases, and the necessity that it have a coefficient of thermal expansion sufficiently dissimilar to that of silicon carbide that as the belt cools the stresses between the belt and its silicon carbide coating cause the coating to separate from the belt. In the apparatus shown, cooling begins as the belt 13 with its coating 28 thereon leaves the deposition chamber 14 and is exposed to ambient temperature. The smooth finish of the belt surface also serves to reduce any tendency for adherence of the coating to the belt, and the coating 28 is simply peeled from the belt and may be wound, for example, on a takeup reel or the like 29.

To aid cooling of the belt and coating, auxiliary cooling means 31 in the form of coils carrying recirculating coolant, for example, may be provided in sliding contact with the belt. The peeled coating is in the form of a ribbon having the width of the belt and may be cut by any known means such as a diamond saw or electron discharge machining equipment to the ultimate size and shape desired. Thin ribbons may be simply stamped to the shape desired.

After the silicon carbide coating 28 is removed from the belt, the endless belt passes around the rollers 11 and 12 and back into the deposition chamber to be recoated. Thus, a continuous ribbon of silicon carbide is formed. The belt and deposition chamber may be made in any desired width to produce ribbons of any desired width. The thickness of the ribbons produced is controlled by controlling the speed with which the belt moves through the chamber, or providing chambers of different lengths, since the rate of deposition per unit of area exposed to the reactants is substantially constant at any given temperature and reactant gas flow rate.

Although resistance heating has been described in the illustrative embodiment, it is to be understood that other types of heating such as high frequency heating or radiant heating may also be used as long as the required deposition temperatures are maintained.

Various other modifications and variations of the present invention are possible in the light of the above teachings.

That which is claimed is:

1. A method of making a ribbon of silicon carbide which comprises:
   providing a belt of material having a coefficient of thermal expansion which is dissimilar to the coefficient of thermal expansion of silicon carbide,
   heating a portion of said belt to a temperature between 1150° C. and 1800° C.,
   depositing on a surface of said heated portion of said belt, by pyrolytic decomposition of a reactant gas mixture containing carbon and silicon, a layer of silicon carbide equal to the desired thickness of the ribbon to be formed, and
   separating said layer of silicon carbide from said belt by cooling said heated portion of said belt, whereby said layer of silicon carbide is caused to separate from said belt due to the stresses between said layer of silicon carbide and said belt caused by said dissimilar coefficients of thermal expansion.

2. A method as defined in claim 1 wherein said cooling consists in passing said heated portion of said belt through air at ambient temperature.

3. A method as defined in claim 1 wherein said cooling includes passing said heated portion of said belt over a coolant carrying coil.

4. A method as defined in claim 1 and further including, during said depositing on a surface of said heated portion of said belt, shielding the other surfaces of said heated portion of said belt to prevent deposition thereupon.

References Cited

UNITED STATES PATENTS

| 2,187,086 | 1/1940 | Koehring | 264—122 |
| 2,677,627 | 5/1954 | Montgomery et al. | 264—81 |
| 3,175,884 | 3/1965 | Kuhn. | |
| 3,218,382 | 11/1965 | Benedict et al. | 264—122 |
| 3,255,284 | 6/1966 | Meislohn | 264—166 |
| 3,294,880 | 12/1966 | Turkat | 264—56 |
| 3,382,574 | 5/1968 | Chadwick | 264—104 |

FOREIGN PATENTS 657,304   2/1963   Canada.

DONALD J. ARNOLD, *Primary Examiner.*

U.S. Cl. X.R.

223—208; 106—44; 264—64, 82, 165, 338